United States Patent
Starkey et al.

(10) Patent No.: US 11,852,103 B2
(45) Date of Patent: Dec. 26, 2023

(54) RING-SHAPED BOOSTER ROCKET

(71) Applicant: Raytheon Company, Waltham, MA (US)

(72) Inventors: Ryan Starkey, Tucson, AZ (US); Dario N. Altamirano, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/181,158

(22) Filed: Feb. 22, 2021

(65) Prior Publication Data

US 2022/0268238 A1  Aug. 25, 2022

(51) Int. Cl.
| | |
|---|---|
| *F02K 9/76* | (2006.01) |
| *F02K 9/08* | (2006.01) |
| *F02K 9/34* | (2006.01) |
| *B64G 1/40* | (2006.01) |
| *F02K 9/97* | (2006.01) |
| *F02K 9/88* | (2006.01) |

(52) U.S. Cl.
CPC ............. *F02K 9/763* (2013.01); *B64G 1/402* (2013.01); *F02K 9/08* (2013.01); *F02K 9/34* (2013.01); *F02K 9/88* (2013.01); *F02K 9/97* (2013.01)

(58) Field of Classification Search
CPC ... B64G 1/403; F02K 9/08; F02K 9/34; F02K 9/78; F02K 9/88; F02K 9/763; F02K 9/97
See application file for complete search history.

(56) References Cited

U.S. PATENT DOCUMENTS

| | | | | |
|---|---|---|---|---|
| 2,683,962 | A * | 7/1954 | Griffith | D01D 5/06 |
| | | | | 415/119 |
| 3,093,964 | A * | 6/1963 | Hausmann | F02K 9/763 |
| | | | | 60/39.47 |
| 3,118,377 | A * | 1/1964 | Davies | F02K 9/30 |
| | | | | 102/374 |
| 3,167,016 | A * | 1/1965 | Czerwinski | F41F 3/04 |
| | | | | 244/3.23 |
| 3,305,194 | A * | 2/1967 | Conard | F42B 10/64 |
| | | | | 244/3.21 |
| 3,806,064 | A | 4/1974 | Parilla | |

(Continued)

OTHER PUBLICATIONS

Salmi, Bryce, The World's Largest 3D Metal Printer is Churning out Rockets, Oct. 25, 2019, IEEE (Year: 2019).*

(Continued)

*Primary Examiner* — Kyle Robert Thomas
(74) *Attorney, Agent, or Firm* — Renner, Otto, Boisselle, & Sklar

(57) ABSTRACT

A rocket booster has an annular shape, with a casing defining an annular space therewithin, and a solid rocket fuel in the annular spacing. The casing may itself at least in part define an annular gap that functions as a nozzle for the rocket booster, with protruding tabs on the casing aiding in maintaining a uniform height of the annular gap. The rocket booster may be mechanically coupled to an object protruding from the back of a fuselage of a flight vehicle, such as a missile. For example, the rocket booster may be placed around an aft turbojet nozzle of the flight vehicle. This allows the rocket booster to be used in situations where primary propulsion must be running both before and after (and perhaps during) the firing of the rocket booster.

16 Claims, 4 Drawing Sheets

(56) References Cited

U.S. PATENT DOCUMENTS

| | | | | |
|---|---|---|---|---|
| 4,745,861 | A | * 5/1988 | Fenton | F02K 9/30 |
| | | | | 102/377 |
| 4,964,339 | A | 10/1990 | Bastian et al. | |
| 5,067,316 | A | * 11/1991 | Bonniot | F02K 9/82 |
| | | | | 239/265.23 |
| 6,968,695 | B2 | 11/2005 | Schmotolocha et al. | |
| 10,400,711 | B2 | 9/2019 | Lee et al. | |
| 2005/0211827 | A1 | * 9/2005 | Barocela | F42B 15/10 |
| | | | | 244/46 |
| 2015/0204274 | A1 | 7/2015 | Fowler | |

OTHER PUBLICATIONS

International Search Report and Written Opinion dated Feb. 10, 2022 in corresponding Application No. PCT/US2021/038389.
The pending claims of related U.S. Appl. No. 17/181,162.
International Search Report and Written Opinion dated Feb. 11, 2022 in corresponding International Application No. PCT/US2021/038387.
Salmi, Bryce, "The World's Largest 3D Metal Printer is Chirning out Rockets," IEEE Spectrum, Oct. 25, 2019, pp. 1-28.

* cited by examiner

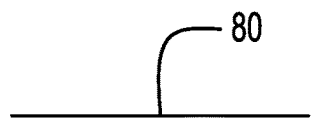
FIG. 5A
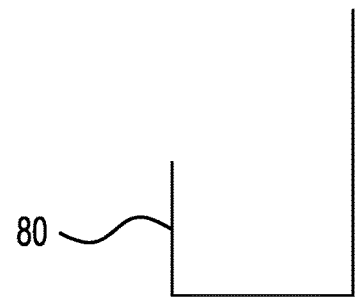
FIG. 5B
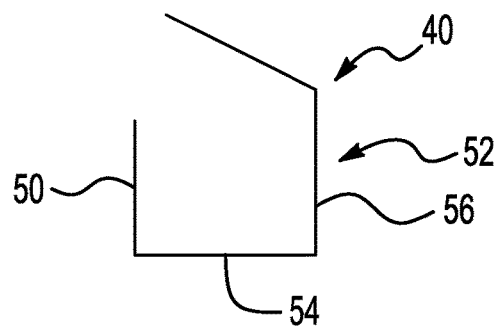
FIG. 5C
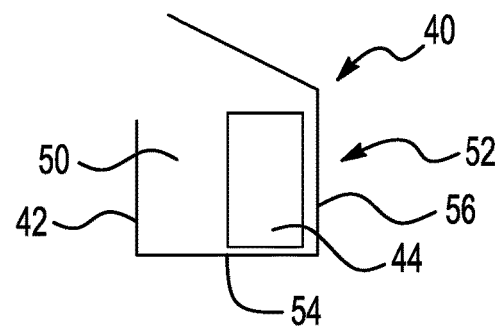
FIG. 5D
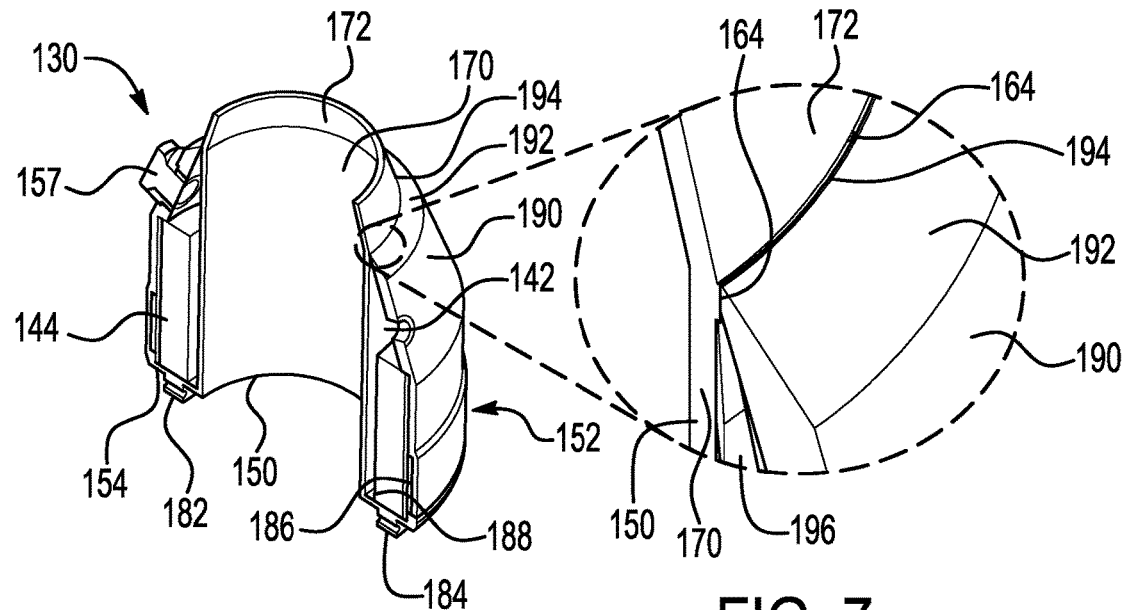
FIG. 6
FIG. 7

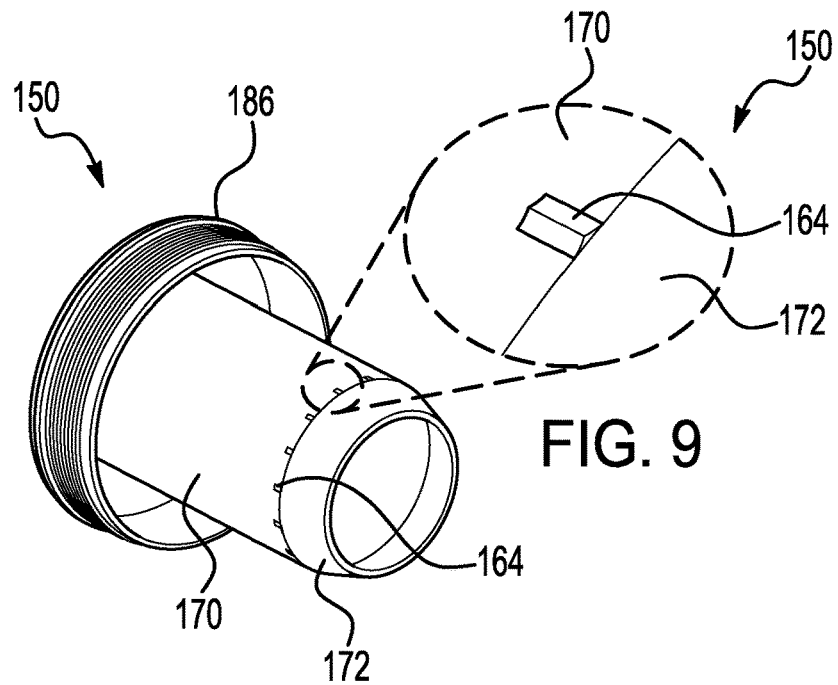
FIG. 8
FIG. 9
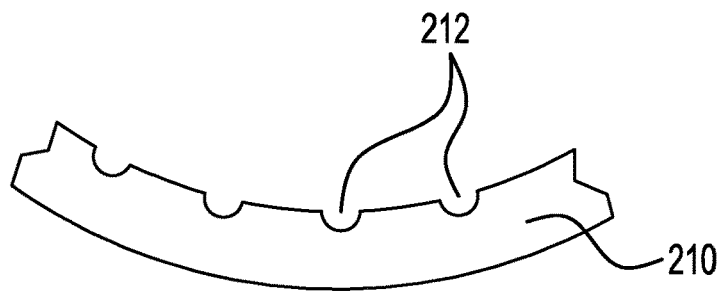
FIG. 10
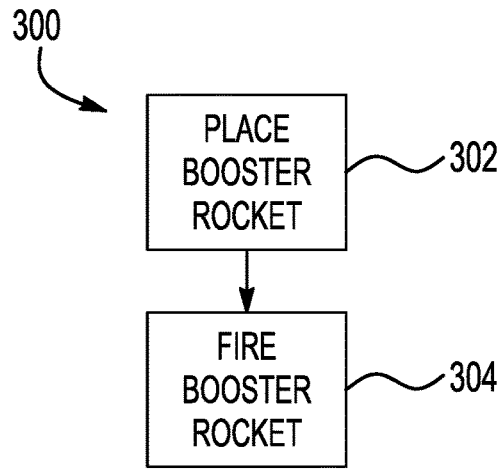
FIG. 11

RING-SHAPED BOOSTER ROCKET

FIELD OF THE INVENTION

The invention is in the field of booster rockets for flight vehicles, such as missiles.

DESCRIPTION OF THE RELATED ART

Booster rockets are sometimes used to add thrust to flight vehicles, such as missiles. Certain limitations are sometimes present regarding the characteristics for add-on booster rockets.

SUMMARY OF THE INVENTION

A booster rocket has an annular shape, allowing it to be placed around an object.

A booster rocket is mechanically coupled to a nozzle of a main propulsion system, such as a jet, without interfering with operation of the jet.

A booster rocket is couplable to a part of existing flight vehicle, adding thrust without expanding the envelope of the flight vehicle.

A booster rocket is mechanically coupled to a part of main propulsion system, and remains so coupled even after the propellant (fuel) of the booster rocket is expended.

According to an aspect of the invention, a booster rocket includes: an annular casing defining an annular space therewithin, and having a central opening; and a solid rocket fuel in the annular space.

According to an embodiment of any paragraph(s) of this summary, the casing is made of metal.

According to an embodiment of any paragraph(s) of this summary, the casing is made of sheet metal.

According to an embodiment of any paragraph(s) of this summary, the casing is a single unitary part.

According to an embodiment of any paragraph(s) of this summary, the casing is multiple casing parts.

According to an embodiment of any paragraph(s) of this summary, the multiple casing parts include an inner casing part and an outer casing part.

According to an embodiment of any paragraph(s) of this summary, the inner casing part and the outer casing part are threadedly coupled together.

According to an embodiment of any paragraph(s) of this summary, the annular casing defines an annular gap that acts as a nozzle for the booster rocket.

According to an embodiment of any paragraph(s) of this summary, the casing includes protruding tabs that maintain the annular gap.

According to an embodiment of any paragraph(s) of this summary, the protruding tabs are circumferentially spaced around the annular gap.

According to an embodiment of any paragraph(s) of this summary, the protruding tabs are on an inner part of the casing.

According to an embodiment of any paragraph(s) of this summary, the protruding tabs are on an outer part of the casing.

According to an embodiment of any paragraph(s) of this summary, the casing includes an inner part and an outer part, with the outer part including a cylindrical forward section, and an inwardly-sloped aft section.

According to an embodiment of any paragraph(s) of this summary, an inner part of the casing includes a cylindrical forward section, and an inwardly sloped aft section.

According to an embodiment of any paragraph(s) of this summary, the inwardly sloped aft section of the inner part is substantially parallel to the inwardly sloped aft section of the outer part.

According to an embodiment of any paragraph(s) of this summary, the inwardly sloped aft section of the outer part includes a wedge portion that decreases in thickness to an aft edge of the outer part.

According to an embodiment of any paragraph(s) of this summary, an outer part of the casing extends further aft than an inner part of the casing.

According to an embodiment of any paragraph(s) of this summary, an inner part of the casing extends further aft than an outer part of the casing.

According to an embodiment of any paragraph(s) of this summary, the casing includes a liner along at least part of an inside surface of the casing, with the liner at least in part defining the annular space.

According to an embodiment of any paragraph(s) of this summary, the fuel is configured within the annular space for end burning.

According to an embodiment of any paragraph(s) of this summary, the fuel is configured within the annular space for core burning.

According to an embodiment of any paragraph(s) of this summary, the fuel is configured within the annular space for both end burning and core burning.

According to an embodiment of any paragraph(s) of this summary, the fuel has one or more channels therein.

According to an embodiment of any paragraph(s) of this summary, the one or more channels include at least one channel in a longitudinal direction.

According to an embodiment of any paragraph(s) of this summary, the fuel is along an outer wall of the casing, with a space between the fuel and an inner wall of the casing.

According to an embodiment of any paragraph(s) of this summary, the booster rocket further includes an igniter in the casing.

According to an embodiment of any paragraph(s) of this summary, the booster rocket is in combination with an object to which the rocket booster is mechanically coupled.

According to an embodiment of any paragraph(s) of this summary, the object is a part of a flight vehicle.

According to an embodiment of any paragraph(s) of this summary, the object is an aft part of a flight vehicle.

According to an embodiment of any paragraph(s) of this summary, the object is part of a propulsion device at an aft end of the flight vehicle.

According to an embodiment of any paragraph(s) of this summary, the object is centered on a longitudinal centerline of the flight vehicle.

According to an embodiment of any paragraph(s) of this summary, the rocket booster is centered around a longitudinal centerline of the flight vehicle.

According to an embodiment of any paragraph(s) of this summary, the object is a turbojet engine.

According to an embodiment of any paragraph(s) of this summary, the object protrudes from an aft end of a fuselage of the flight vehicle.

According to an embodiment of any paragraph(s) of this summary, the flight vehicle is a missile.

According to another aspect of the invention, a missile includes: a fuselage; a main propulsion system that includes a nozzle protruding aftward from the fuselage; and a booster rocket around the nozzle. The booster rocket includes: an annular casing defining an annular space therewithin, and having a central opening through which the nozzle protrudes; and a solid rocket fuel in the annular space.

According to yet another aspect of the invention, a method for increasing thrust of a flight vehicle includes the steps of: placing an annular booster rocket around a part of a main propulsion system of the flight vehicle; and burning fuel of the booster rocket to product thrust.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 5A is a cross-sectional view illustrating a first step in forming the booster rocket of FIG. 2.

FIG. 5B is a cross-sectional view illustrating a second step in forming the booster rocket of FIG. 2.

FIG. 5C is a cross-sectional view illustrating a third step in forming the booster rocket of FIG. 2.

FIG. 5D is a cross-sectional view illustrating a fourth step in forming the booster rocket of FIG. 2.

FIG. 6 is an oblique sectional view showing a booster rocket according to another embodiment of the invention.

FIG. 7 is a detailed view of a portion of the booster rocket of FIG. 6, showing engagement of tabs of the booster rocket to maintain an annular gap.

FIG. 8 is an oblique view of an inner part of the booster rocket of FIG. 6.

FIG. 9 is a detailed view of a portion of the inner part of FIG. 8, highlighting one of the tabs on the outer surface of the inner part.

FIG. 10 is a schematic cross-sectional view of a portion of a channeled annular fuel usable with booster rockets in embodiments of the invention.

FIG. 11 is a high-level flow chart of a method of increasing thrust of a flight vehicle, according to an embodiment of the invention.

DETAILED DESCRIPTION

A rocket booster has an annular shape, with a casing defining an annular space therewithin, and a solid rocket fuel in the annular spacing. The casing may itself at least in part define an annular gap that functions as a nozzle for the rocket booster, with protruding tabs on the casing aiding in maintaining a uniform height of the annular gap. The rocket booster may be mechanically coupled to an object protruding from the back of a fuselage of a flight vehicle, such as a missile. For example, the rocket booster may be placed around an aft turbojet nozzle of the flight vehicle. This allows the rocket booster to be used in situations where primary propulsion must be running both before and after (and perhaps during) the firing of the rocket booster. The rocket booster also advantageously may provide thrust along the centerline of the flight vehicle, and may be used in situations where there is a requirement to maintain the booster as part of the flight vehicle throughout flight. The rocket booster may have a truncated aerospike nozzle configuration, and may provide for a low-drag additional propulsion system that does not interfere with the operation of the primary propulsion system. Further, the casing of the rocket booster may double as a rear jet engine mount.

Figure 1:
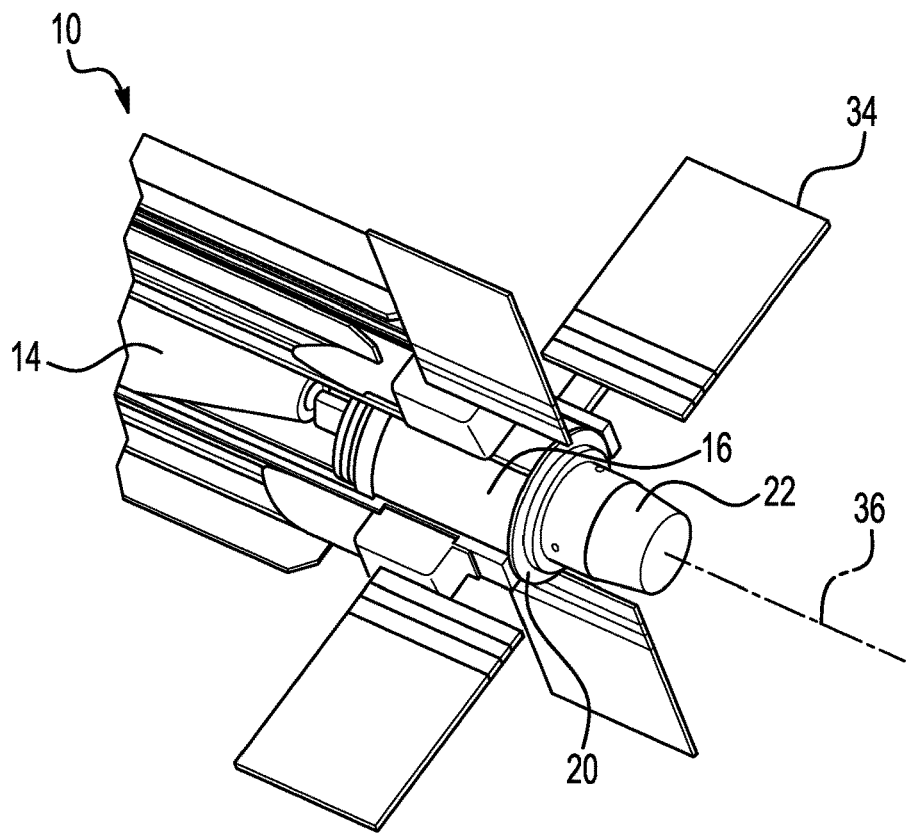
FIG. 1 is an oblique view of a portion of a flight vehicle, capable of receiving a booster rocket according to an embodiment of the present invention.
Figure 2:
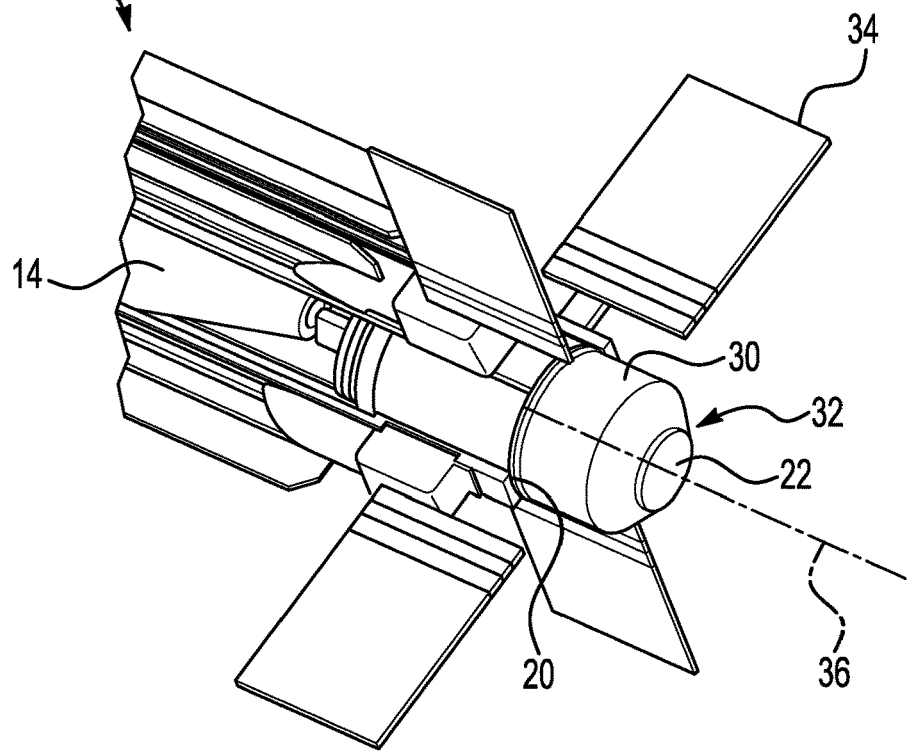
FIG. 2 is an oblique of the flight vehicle portion of FIG. 1, with the booster rocket installed.

With reference initially to FIGS. 1 and 2, a flight vehicle 10, such as a missile, includes a fuselage 14, with a main propulsion device 16 protruding from or as part of an aft end 20 of the fuselage 14. The main propulsion device 16 may be a turbojet engine. The protruding part of the main propulsion device 16 may be a nozzle 22 of the turbojet engine.

As shown in FIG. 2, a booster rocket 30 may be mounted on and around the nozzle 22, with the nozzle 22 protruding through a central opening 32 in the booster rocket 30. The booster rocket 30 may thereby provide additional thrust to the flight vehicle 10, without interfering with the operability of the main propulsion device 16. The booster rocket 30 may provide the additional thrust without affecting the general envelope of the flight vehicle 10.

The missile (flight vehicle) 10 may have additional features, for example fins 34 or other wings or control surfaces. Other types of additional features include a guidance system, a communications system, various types of sensors or information-gathering features, and a payload such as a warhead or other destructive material.

The booster rocket 30 is shown mounted around the nozzle 22, but it will be appreciated that the nozzle 22 is but one example of a broader category of objects to which the booster rocket 30 is mounted. The object may alternatively be other sorts of structures, whether provide a propulsive function or not, that pass into or through the central opening 32 of the booster rocket 30. Advantageously, both the object (the nozzle 22 in the illustrated embodiment) and the booster rocket 30 are centered around a longitudinal centerline (central axis) 36 of the flight vehicle 10.

The flight vehicle 10 is just one example of the many types of flight vehicles that may receive the booster rocket 30, in order to produce additional thrust. Alternatives to the missile are other types of vehicles with main propulsion devices of any of a variety of suitable types.

Figure 3:
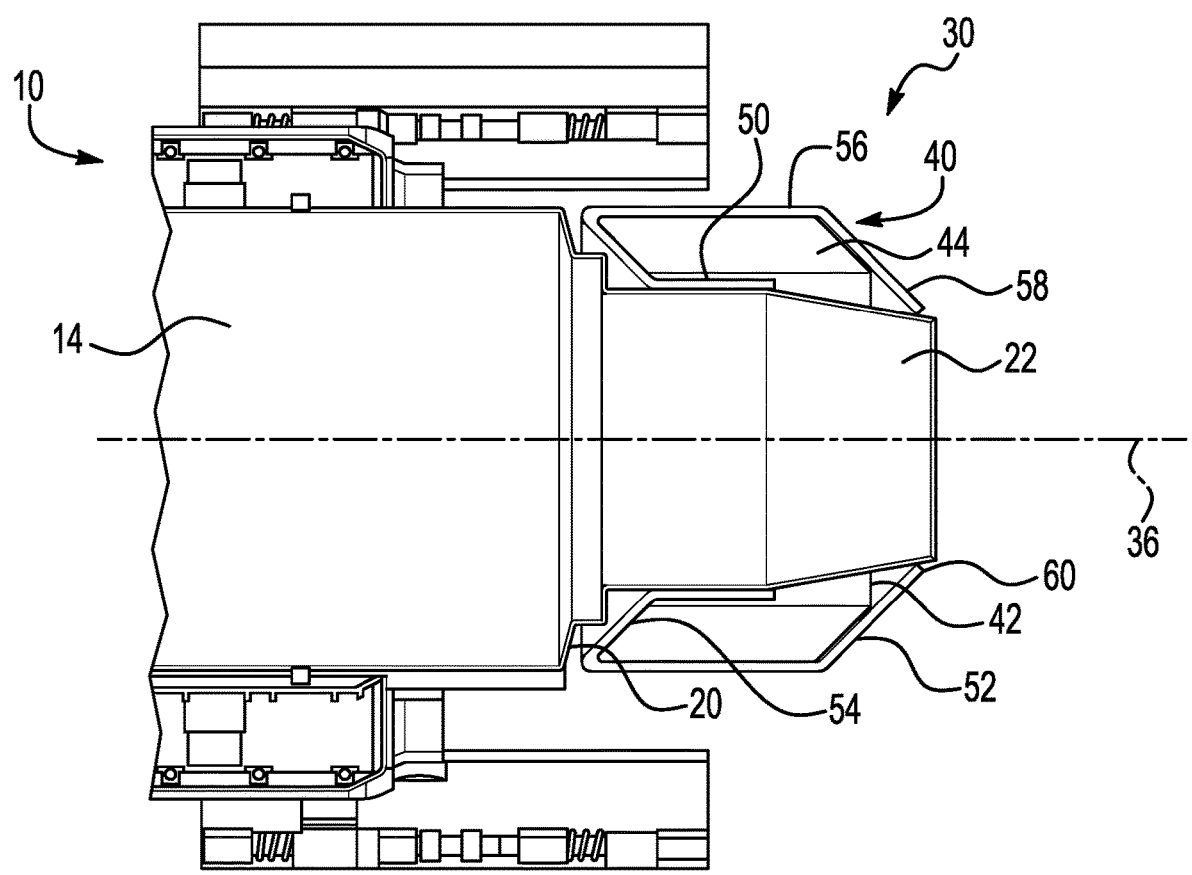
FIG. 3 is a side sectional view of the booster rocket of FIG. 2.

FIG. 3 shows further details of one embodiment of the booster rocket 30. The rocket 30 includes an annular casing 40 that defines an annular space 42 where a solid rocket fuel (propellant) 44 is located. The casing 40 may be made up of multiple parts, such as an inner casing part 50 and an outer casing part 52, linked together by an aft end casing part 54. In the illustrated embodiment the parts 50-54 are all parts of a single unitary part that is made of metal, such as being made out of a single piece of sheet metal, for example steel. However in other embodiments the casing 40 may be made of multiple parts.

The outer casing part 52 includes a cylindrical forward section 56, and an inwardly-sloped aft section 58 that is bent inward toward the turbojet nozzle 22. In some embodiments the slope of the aft section 58 may correspond to a slope of the turbojet nozzle 22.

Many configurations are possible for the fuel (propellant) 44. In the illustrated embodiment, the fuel 44 is along the outer part 52 of the casing 40, with a space between the fuel 44 and the inner part 50 of the casing 40. The fuel 44 may be configured for core burning, for end burning, or for a combination of end burning and core burning. As described further below, the fuel 44 may optionally have one or more channels therein, of any of various suitable configurations, to control the burn rate. Such channels, when present, may include at least one channel in a longitudinal (axial) direction, parallel to an axis of the flight vehicle 10 (the centerline 36), which may be coincident with axes of both the booster rocket 30 and the object (such as the turbojet nozzle 22) to and around which the booster rocket 30 is mounted.

The fuel 44 is located between the inner part 50 and the outer part 52. Combustion of the fuel 44 occurs in the annular space 42, which acts as a combustion chamber for the booster rocket 30. Pressurized gases from the combustion of the fuel 44 exit the booster rocket 30 at an aft end, through an annular rocket nozzle 60 defined at least in part by the casing 40. In the illustrated embodiment the annular nozzle 60 is an annular gap between the outer casing part 52 and an outer surface of the turbojet nozzle 22 that serves as the object around which the rocket booster 30 is installed.

Figure 4:
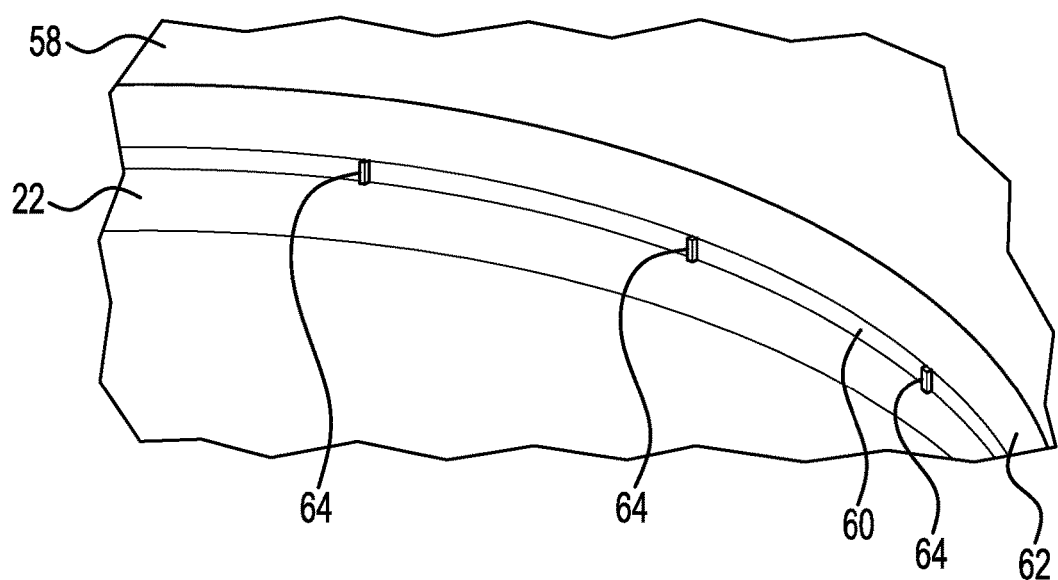
FIG. 4 is a detailed end view of a portion of the booster rocket and nozzle shown in FIG. 3.

With reference now in addition to FIG. 4, the casing 40 may have features that help maintain a desired configuration of the gap that serves as the rocket nozzle 60. At an aft edge 62 of the outer casing part 52 (the edge of the aft section 58 of the outer casing part 52) there are a series of protruding tabs 64. The protruding tabs 64 protrude inward to maintain a desired spacing between the edge 62 and the turbojet nozzle 22. The protruding tabs 64 may be evenly circumferentially spaced around the edge 62. The tabs 64 may be deformed or otherwise produced from the material of the outer casing part 52, or may be material added on to an inner surface (inner wall) of the outer casing part 52.

FIGS. 5A-5D illustrate a method for making the rocket booster 30, and in particular for forming the annular casing 40, showing a cross-section of material used to produce the casing 40 (FIG. 3). FIG. 5A shows flat stock 80, which may be cut to a suitable size and shape by a suitable process, such as by stamping, laser cutting, or water jet cutting. FIG. 5B shows the shape of the stock 80 after a first strike, with inner and outer segments of material to form the inner and outer parts of the casing.

FIG. 5C shows a third step, to produce the section of the outer casing part that folds inward. The parts of the casing 40 are labeled in FIG. 5C as described above, with the casing parts 50, 52, and 54, and with the forward section 56 and the aft section 58 of the outer casing part 52.

Finally, FIG. 5D shows the situation with the fuel or propellant 44 introduced into the annular space 42 that is within and defined by the casing 40. The casing 40 is thus formed by simple manufacturing steps from a single piece of material.

Many variations are possible in the configuration of a booster rocket that is capable of being installed around an object. Some alternative configurations are described below, and different sorts of manufacturing techniques may be used to produce the booster rocket 30, and alternative booster rocket configurations.

The booster rocket 30 may have additional features not shown in the figures, for example having an igniter placed in an opening in the casing 40 at a suitable location for igniting the fuel (propellant) 44. Such additional features may be shown in one or more of the other embodiments shown below.

The booster rocket 30 advantageously uses the turbojet nozzle 22 for some of its inner boundary. That is, an outer surface of the turbojet nozzle 22 provides part of the boundary of the annular space 42 (FIG. 3).

The booster rocket 30 provides a low profile, without impacting the envelope of the flight vehicle 10 (FIG. 1). The low profile means that the rocket booster 30 does not significantly impact the drag of the flight vehicle 10. The rocket 30 is retained without the flight vehicle 10 after use, and does not prevent use of the main propulsion device 16 (FIG. 1), before, after, or during firing of the booster rocket 30. The rocket 30 may be configured to operate with a truncated aerospace nozzle configuration, which is compact and altitude compensating.

FIGS. 6-9 show an alternative configuration, a booster rocket 130 that has a casing 140 that has two parts 150 and 152 that are threadedly joined together. The parts 150 and 152 are formed separately and screwed together along threads 155, after an annular solid fuel (propellant) 144 is put into place. Once the parts 150 and 152 are joined together the fuel 144 is in an annular space 142 defined by the parts 150 and 152. The fuel 144 can be ignited by an igniter 157 that is secured in a hole in the outer casing part 152. Pressurized gasses from combustion of the fuel 144 pass through an annular nozzle 160 that is defined between the casing parts 150 and 152. The gap height of the annular nozzle 160 may be maintaining by tabs 164 on the inner casing part 150, as described further below.

The inner casing part 150 has a cylindrical forward section 170 and an inwardly-angled aft section 172. The inner casing part sections 170 and 172 may correspond in exterior shape to an object to which the rocket booster 130 is coupled, for example to the shape of a turbojet nozzle. Further, the inwardly-angled aft section 172 may constitute a truncated aerospike shape, which may provide for efficiency in the operation of the booster rocket 130. The inner casing part 150 includes a forward end 154 which constitutes the forward end of the rocket booster 130. The forward end 154 may have mechanical connections 182 and 184 thereupon, which may be configured to connect the booster rocket 130 to a flight vehicle. The mechanical connections 182 and 184 may be any of a variety of suitable clips, clamps, or other suitable mechanisms for making a connection.

The inner casing part 150 also includes an externally threaded outer portion 186 that is used to make the threaded connection with an internally threaded cylindrical aft section 188 of the outer casing part 152. The outer casing part 152 has an inwardly-sloped aft section 190 that has a wedge portion 192 of varying thickness, that tapers to an edge 194 that forms a boundary of the annular nozzle 160. The inward slope angle of the outer casing aft section 190 may be the same as, substantially similar to, or similar to, the inward slope of the inner casing part aft section 172. Thus the aft sections 172 and 190 may be parallel to one another.

As best seen in FIGS. 8 and 9, the tabs 164 are a series of protrusions circumferentially spaced around an aft end of the inner casing cylindrical section 170, where the sections 170 and 172 meet. These tabs 164 mechanically engage the edge 194 of the outer casing portion 150, as best seen in FIGS. 6 and 7, to maintain an even height for the annular gap of the nozzle 160.

The casing parts 150 and 152 may have a liner 196 on their surfaces that define the annular space 142 that acts as the combustion chamber. The liner 196 may be a heat-resistant material that provides some protection to the casing parts 150 and 152. The liner 196 may be made of any of a variety of suitable materials, non-limiting examples being aluminum and cardboard.

FIG. 10 shows a cross-sectional shape of an annular fuel 210 that includes a series of longitudinal channels 212 to regulate the burn speed and thus the thrust production. Such channels may have any of a variety of suitable configurations (depths and/or shapes, for example), and there may be various numbers of channels, with any of various suitable spacings, to produce a desire thrust profile over time. It should be appreciated that the configuration shown in FIG. 10 is for illustration purposes, and the channels 212 shown are necessarily to scale.

FIG. 11 shows a method 300 of use of a booster rocket, such as the booster rocket 30 (FIG. 3) or the booster rocket 130 (FIG. 6). In step 302 the booster rocket is placed around a part of a flight vehicle, such as a nozzle of a main propulsion system, which may be a turbojet. In step 304 propellant (fuel) of the booster rocket is burned used to provide additional thrust to the flight vehicle, before, after, or during operation of the main propulsion system. The booster rocket remains connected to the flight vehicle even after operation.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A booster rocket comprising:
   an annular casing defining an annular space therewithin, and having a central opening; and
   a solid rocket fuel in the annular space;
   wherein the annular casing defines an annular gap that acts as a nozzle for the booster rocket; and
   wherein the booster rocket is a capable of being placed around and installed around a separate object; and
   wherein the annular casing includes an inner part and an outer part, with the outer part including a cylindrical forward section, and an inwardly-sloped aft section that directs flow inwardly as the flow approaches the annular gap that is at an aft end of the outer part, wherein the inwardly-sloped aft section continually slopes inward to the aft end of the outer part, wherein the annular gap is narrowest at the aft end of the outer part, wherein the annular casing includes protruding tabs at an aft end of the annular casing configured to contact but not fixedly attach to the separate object to maintain the annular gap.

2. The booster rocket of claim 1, wherein the annular casing is made of metal.

3. The booster rocket of claim 1, wherein the annular casing is a single unitary part.

4. The booster rocket of claim 1, wherein the inner part and the outer part are threadedly coupled together.

5. The booster rocket of claim 1, wherein the inner part of the annular casing includes a cylindrical forward section, and an inwardly sloped aft section.

6. The booster rocket of claim 1, further comprising an igniter in the annular casing.

7. The booster rocket of claim 1, in combination with the separate object to which the booster rocket is mechanically coupled.

8. The combination of claim 7, wherein the separate object is an aft part of a flight vehicle.

9. The combination of claim 8, wherein the separate object is part of a propulsion device at an aft end of the flight vehicle.

10. The combination of claim 8, wherein the separate object is centered on a longitudinal centerline of the flight vehicle.

11. The combination of claim 8, wherein the booster rocket is centered around a longitudinal centerline of the flight vehicle.

12. The combination of claim 8, wherein the separate object protrudes from an aft end of a fuselage of the flight vehicle.

13. The combination of claim 8, wherein the flight vehicle is a missile.

14. The combination of claim 7, wherein the separate object is a part of a turbojet engine.

15. The booster rocket of claim 1,
   in combination with the separate object;
   wherein the separate object is part of a propulsion device at an aft end of a flight vehicle;
   wherein the inner part of the casing is in contact with an outer surface of the propulsion device but is not fixedly attached to the outer surface of the propulsion device.

16. A missile comprising:
   a fuselage;
   a main propulsion system that includes a nozzle protruding aftward from the fuselage; and
   a booster rocket around the nozzle, the booster rocket including:
      an annular casing defining an annular space therewithin, and having a central opening through which the nozzle protrudes; and
      a solid rocket fuel in the annular space;
   wherein the annular casing defines an annular gap that acts as a nozzle for the booster rocket;
   wherein an inner surface of the annular casing is in contact with an outer surface of the nozzle, but is not fixedly attached to the outer surface of the nozzle; and
   wherein the annular casing includes an inner part and an outer part, with the outer part including a cylindrical forward section, and an inwardly-sloped aft section that directs flow inwardly as the flow approaches the annular gap that is at an aft end of the outer part, wherein the inwardly-sloped aft section continually slopes inward to the aft end of the outer part, wherein the annular gap is narrowest at the aft end of the outer part,
   wherein the annular casing includes protruding tabs at an aft end of the annular casing that are in contact with but not fixedly attached to the outer surface of the nozzle to maintain the annular gap.

* * * * *